(12) United States Patent
Zhao

(10) Patent No.: US 12,315,132 B2
(45) Date of Patent: May 27, 2025

(54) APPEARANCE INSPECTION APPARATUS AND APPEARANCE INSPECTION METHOD

(71) Applicant: Keyence Corporation, Osaka (JP)

(72) Inventor: Xinliang Zhao, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 431 days.

(21) Appl. No.: 17/958,474

(22) Filed: Oct. 3, 2022

(65) Prior Publication Data

US 2023/0162344 A1 May 25, 2023

(30) Foreign Application Priority Data

Nov. 24, 2021 (JP) .................... 2021-190172

(51) Int. Cl.
*G06T 7/00* (2017.01)
*G06T 5/70* (2024.01)
*G06V 10/75* (2022.01)

(52) U.S. Cl.
CPC .............. *G06T 7/0008* (2013.01); *G06T 5/70* (2024.01); *G06V 10/751* (2022.01); *G06T 2207/10024* (2013.01); *G06T 2207/20081* (2013.01); *G06T 2207/20182* (2013.01)

(58) Field of Classification Search
CPC ...................... G06T 7/0008; G06T 5/70; G06T 2207/10024; G06T 2207/20081; G06T 2207/20182; G06V 10/751
USPC .......................................................... 382/141
See application file for complete search history.

(56) References Cited

FOREIGN PATENT DOCUMENTS

JP         2019204321 A         11/2019

OTHER PUBLICATIONS

Sunil, K. V., et al. "MVAi: A Framework and Three Stage Approach to Defect Detection." 2021 IEEE Mysore Sub Section International Conference (MysuruCon). IEEE, 2021. (Year: 2021).*
Pan, Haihong, et al. "A new image recognition and classification method combining transfer learning algorithm and mobilenet model for welding defects." Ieee Access 8 (2020): 119951-119960. (Year: 2020).*

(Continued)

*Primary Examiner* — Jonathan S Lee
(74) *Attorney, Agent, or Firm* — Kilyk & Bowersox, P.L.L.C.

(57) ABSTRACT

When a machine learning network trained with both a non-defective product image and a defective product image is used, it is possible to stably exhibit high detection capability for the defective product image having an unknown defect while shortening a takt time during the operation time. A processor executes a first learning process of causing a machine learning network to learn a non-defective product image added with a noise, and a second learning process of causing the machine learning network to learn a defective product image, and detects both an unknown defect having a characteristic different from a characteristic of the non-defective product image and a known defect having a characteristic designated as a defective site, by inputting a workpiece image to the machine learning network whose parameter has been adjusted by the first learning process and the second learning process.

10 Claims, 7 Drawing Sheets

(56) References Cited

OTHER PUBLICATIONS

Han, Ming, Qingxiang Wu, and Xiongjun Zeng. "Single-scale workpiece defect detection based on deep learning." 2019 12th International Congress on Image and Signal Processing, BioMedical Engineering and Informatics (CISP-BMEI). IEEE, 2019. (Year: 2019).*

Niu, Shuanlong, et al. "Defect image sample generation with GAN for improving defect recognition." IEEE Transactions on Automation Science and Engineering 17.3 (2020): 1611-1622. (Year: 2020).*

U.S. Appl. No. 17/958,478, filed Oct. 3, 2022 (64 pages).

* cited by examiner

APPEARANCE INSPECTION APPARATUS AND APPEARANCE INSPECTION METHOD

CROSS-REFERENCE TO RELATED APPLICATIONS

The present application claims foreign priority based on Japanese Patent Application No. 2021-190172, filed Nov. 24, 2021, the contents of which are incorporated herein by reference.

BACKGROUND OF THE INVENTION

1. Field of the Invention

The disclosure relates to an appearance inspection apparatus and an appearance inspection method for inspecting an appearance of a workpiece.

2. Description of Related Art

For example, Japanese Patent Application Laid-Open No. 2019-204321 discloses a processing apparatus that determines whether a workpiece is a non-defective product or a defective product using machine learning by a computer.

The processing apparatus of Japanese Patent Application Laid-Open No. 2019-204321 is configured to be capable of making a determination on whether a workpiece to be determined is a non-defective product or a defective product using a non-defective product learning model and a defective product learning model by conducting supervised machine learning for non-defective product data to generate the non-defective product learning model, and conducting supervised machine learning for defective product data to generate the defective product learning model, and then, inputting data of the workpiece, and such an apparatus is also called a workpiece appearance inspection apparatus.

Meanwhile, a defective product is hardly generated at a workpiece production site, and thus, there is a circumstance that it is easy to collect a large amount of non-defective product data, but it is difficult to collect defective product data. Therefore, non-defective product learning targeted for the non-defective product data is assumed as a solution, but in a case of a machine learning network trained only with the non-defective product data, a detection capability of a defective product is insufficient, and an inspection with a high degree of difficulty is inferior in performance as compared with defective product learning.

Even if a large number of pieces of defective product data can be collected, a machine learning network that has trained with defective products exhibits a high detection capability with respect to defect data taught at the time of learning, but detection with respect to unknown defect data is unstable, so that detection omission tends to occur.

Therefore, a method of generating the non-defective product learning model trained with non-defective product data and the defective product learning model trained with defective product data, performing an inference process on a workpiece image using each of the non-defective product learning model and the defective product learning model during the operation time, and combining obtained inference result is conceivable as disclosed in Japanese Patent Application Laid-Open No. 2019-204321.

However, in a case where the non-defective product learning model and the defective product learning model are used, tuning at the time of learning is required for each of the two models, and tuning is also required for the process of combining the two inference results, and thus, a learning difficulty level increases and the labor at the time of learning also increases.

In addition, when an appearance of a workpiece is inspected using the non-defective product learning model and the defective product learning model, a processing time becomes long since the inference process is performed in each of the two models, and moreover, the process of combining the two inference results also requires time, so that an increase in takt time may become a problem.

Furthermore, non-defective product learning and defective product learning originally have different properties, and thus, there may be a case where it is difficult to construct logic that absorbs the difference in properties between the non-defective product learning and the defective product learning.

SUMMARY OF THE INVENTION

The disclosure has been made in view of the above points, and an object thereof is to enable stably exhibition of high detection capability for a defective product image having an unknown defect while shortening a takt time during the operation time by using a machine learning network trained with both a non-defective product image and a defective product image.

In order to achieve the above object, in one embodiment of the disclosure, it is possible to assume an appearance inspection apparatus including: a storage section that stores a machine learning network; and a processor that inputs a workpiece image obtained by capturing a workpiece, which is an object to be inspected, to the machine learning network and determines quality of the workpiece based on the input workpiece image. The processor is configured to be capable of executing a first learning process of adding a noise to a non-defective product image corresponding to a non-defective product, causing the machine learning network to learn the non-defective product image added with the noise, and adjusting a parameter of the machine learning network such that a portion corresponding to the noise is extracted. In addition, the processor is configured to be capable of executing a second learning process of causing the machine learning network to learn a defective product image corresponding to a defective product having a defective site and adjusting the parameter of the machine learning network such that the defective site designated in advance by the user is extracted on the defective product image. Further, the processor is configured to be capable of executing a process of detecting both an unknown defect having a characteristic different from a characteristic of the non-defective product image and a known defect having a characteristic designated as the defective site, by inputting the workpiece image to the machine learning network of which the parameter has been adjusted through the first learning process and the second learning process.

According to this configuration, not only the learning of the machine learning network is performed by the defective product image, but also the learning of the machine learning network is performed using the non-defective product image added with the noise, and thus, the machine learning network having not only high detection capability for a known defect included in the defective product image used for learning but also high detection capability for an unknown defect. As a result, a learning difficulty level is reduced as compared with a case where an inference process is performed in a non-defective product learning model and a defective product learning model as in the related art, and the labor at the time of learning can be reduced. In addition, a process of combining inference results is unnecessary at the time of the appearance inspection, and thus, a takt time during the operation time becomes short.

The processor according to another embodiment can execute the first learning process of causing an input image, obtained by adding a noise to the non-defective product image, to be input to the machine learning network and adjusting the parameter of the machine learning network such that an abnormality map indicating a position of the noise becomes a first output image, and the second learning process of inputting the defective product image, for which the designation of the defective site by the user has been received, to be input to the machine learning network and adjusting the parameter of the machine learning network such that an abnormality map indicating a position of the defective site designated by the user becomes a second output image when performing a setting of the appearance inspection apparatus.

According to this configuration, it is possible to directly extract the defective site as an abnormality in both non-defective product learning and defective product learning and output an abnormality map.

The processor according to still another embodiment can generate a target abnormality map image, based on a difference in pixel values between corresponding sites of the non-defective product image added with the noise and a non-defective product image to which the noise is not added, and adjust the parameter of the machine learning network such that the first output image coincides with the target abnormality map image during the first learning process, and thus, a learning effect using the non-defective product image added with the noise is improved.

The processor according to still another embodiment randomly adds a plurality of the noises having a predetermined size or more to the non-defective product image, and thus, detection performance of a fine defective site is improved while suppressing a portion, such as the vicinity of an edge of the workpiece, from being erroneously detected as the defective site.

The processor according to still another embodiment adds the noise as a color to the non-defective product image when the non-defective product image is a color image, and thus, detection performance for an abnormality in color is improved.

The processor according to still another embodiment more increases the amount of the noise to be added to the non-defective product image as the non-defective product image is larger, and thus, it is possible to automatically add the amount of the noise suitable for the size of the non-defective product image, and thus, it is possible to enhance the learning effect while reducing the labor of the user.

The processor according to still another embodiment adds a plurality of types of the noises having different shapes to the single non-defective product image, and thus, it is possible to improve the detection performance for unknown defects having various shapes.

The processor according to still another embodiment executes an update process of causing the machine learning network to learn an original data set to which a defective product image with annotation information in which a defective site is designated by an annotation has been added and updating the parameter of the machine learning network in a case where the workpiece image is an image obtained by capturing a defective product, but is not determined as the defective product, and thus, it is possible to suppress detection omission of the defective site.

The processor according to still another embodiment executes, in a case where the workpiece image is an image obtained by capturing a non-defective product but is determined as a defective product as a result of the inspection process, an update process of causing the machine learning network to learn an original data set to which the image has been added as a non-defective product image and updating the parameter of the machine learning network, and thus, it is possible to suppress the erroneous detection.

Since the machine learning network is trained with both the image obtained by adding the noise to the non-defective product image and the defective product image as described above, it is possible to detect both the unknown defect having the characteristic different from a characteristic of the non-defective product image and the known defect designated as the defective site. As a result, it is possible to stably exhibit the high detection capability for the defective product image having the unknown defect while shortening the takt time during the operation time.

DETAILED DESCRIPTION OF PREFERRED EMBODIMENTS

Hereinafter, an embodiment of the invention will be described in detail with reference to the drawings. Note that the following description of the preferred embodiment is merely an example in essence, and is not intended to limit the invention, its application, or its use.

Figure 1:
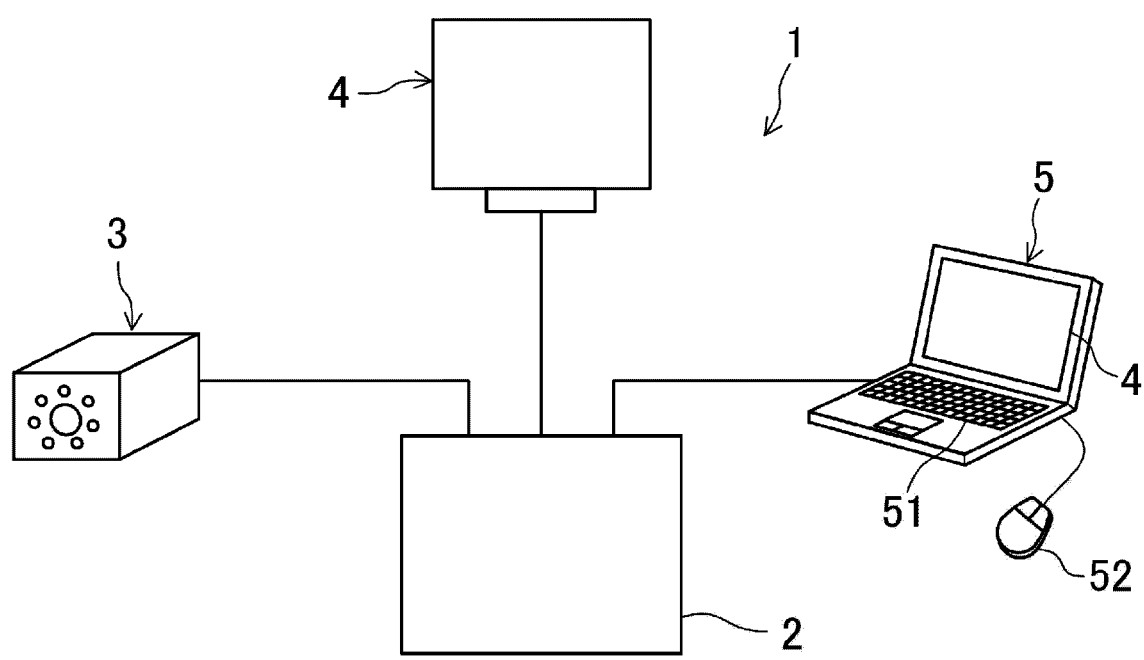
FIG. 1 is a schematic diagram illustrating a configuration of an appearance inspection apparatus according to an embodiment of the invention.

FIG. 1 is a schematic diagram illustrating a configuration of an appearance inspection apparatus 1 according to the embodiment of the invention. The appearance inspection apparatus 1 is an apparatus configured to perform quality determination of a workpiece image acquired by capturing a workpiece as an object to be inspected, such as various components and products, and can be used in a production site such as a factory. Specifically, a machine learning network is constructed inside the appearance inspection apparatus 1, and this machine learning network is generated by learning a non-defective product image corresponding to a non-defective product and a defective product image corresponding to a defective product. The quality determination of the workpiece image can be performed by the machine learning network by inputting the workpiece image obtained by capturing the workpiece as the object to be inspected to the generated machine learning network.

All workpieces may be used as objects to be inspected, or only some of the workpieces may be used as objects to be inspected. In addition, one workpiece may include a plurality of objects to be inspected. In addition, a workpiece image may include a plurality of workpieces.

The appearance inspection apparatus 1 includes a control unit 2 serving as an apparatus main body, an imaging unit 3, a display apparatus (display section) 4, and a personal computer 5. The personal computer 5 is not essential and can be omitted. Various types of information and images can be displayed using the personal computer 5 instead of the display apparatus 4, and a function of the personal computer 5 can be incorporated in the control unit 2 or the display apparatus 4.

In FIG. 1, the control unit 2, the imaging unit 3, the display apparatus 4, and the personal computer 5 are described as examples of a configuration example of the appearance inspection apparatus 1, but any plurality of these may be combined and integrated. For example, the control unit 2 and the imaging unit 3 can be integrated, or the control unit 2 and the display apparatus 4 can be integrated. In addition, the control unit 2 can be divided into a plurality of units and a part thereof may be incorporated into the imaging unit 3 or the display apparatus 4, or the imaging unit 3 can be divided into a plurality of units and a part thereof can be incorporated into another unit.

[Configuration of Imaging Unit 3]

Figure 2:
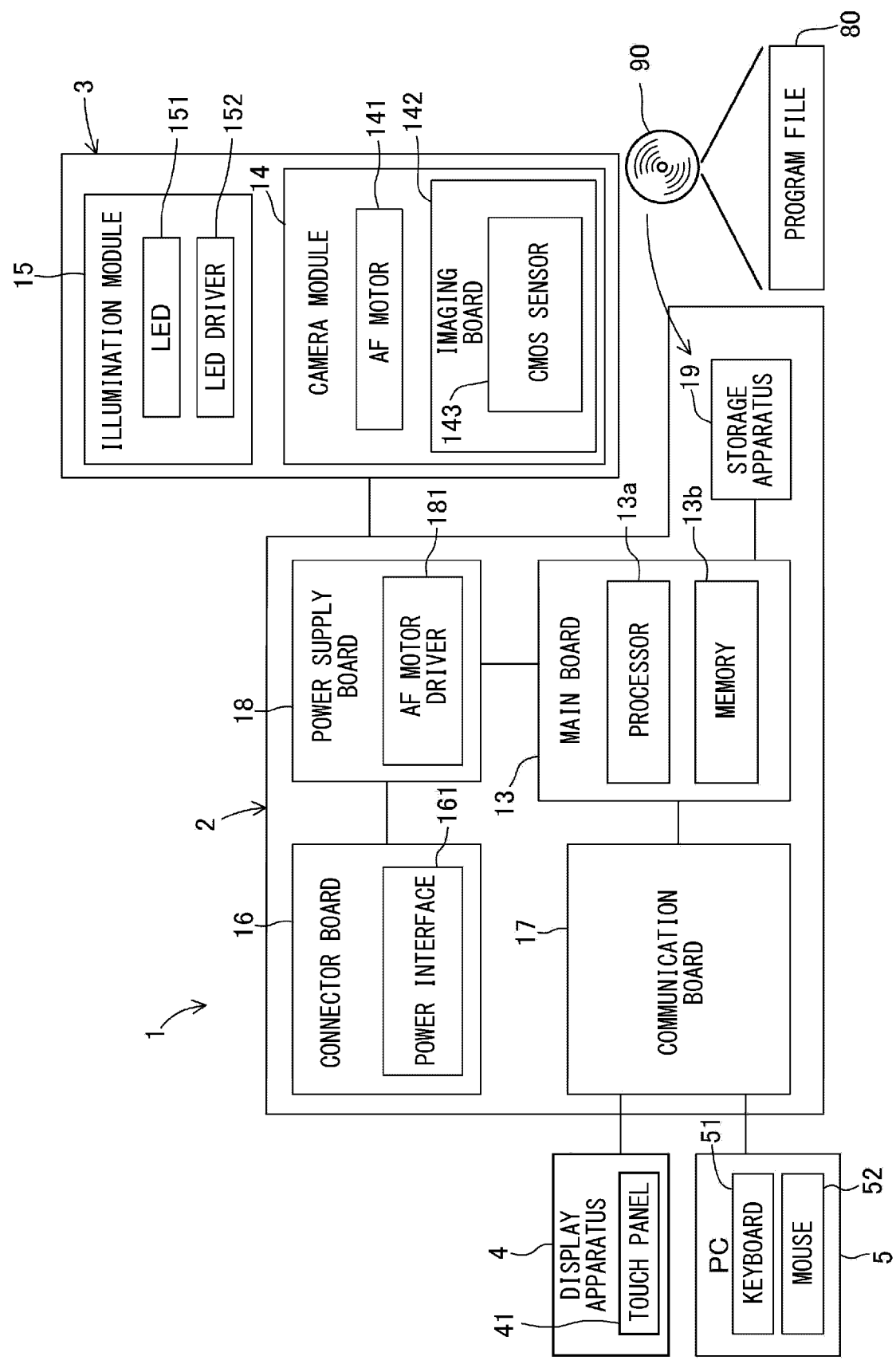
FIG. 2 is a block diagram illustrating a hardware configuration of the appearance inspection apparatus.

As illustrated in FIG. 2, the imaging unit 3 includes a camera module (imaging section) 14 and an illumination module (illumination section) 15, and is a unit that executes acquisition of a workpiece image. The camera module 14 includes an AF motor 141 that drives an imaging optical system and an imaging board 142. The AF motor 141 is a portion that automatically executes focus adjustment by driving a lens of an imaging optical system, and can perform the focus adjustment by a conventionally known technique such as contrast autofocus. The imaging board 142 includes a CMOS sensor 143 as a light receiving element that receives light incident from the imaging optical system. The CMOS sensor 143 is an imaging sensor configured to be capable of acquiring a color image. Instead of the CMOS sensor 143, for example, a light receiving element such as a CCD sensor can be used.

The illumination module 15 includes a light emitting diode (LED) 151 as a light emitter that illuminates an imaging region including a workpiece, and an LED driver 152 that controls the LED 151. A light emission timing, a light emission time, and a light emission amount of the LED 151 can be arbitrarily controlled by the LED driver 152. The LED 151 may be integrated with the imaging unit 3, or may be provided as an external illumination unit separately from the imaging unit 3.

(Configuration of Display Apparatus 4)

The display apparatus 4 includes a display panel configured using, for example, a liquid crystal panel, an organic EL panel, or the like. A workpiece image, a user interface image, and the like output from the control unit 2 are displayed on the display apparatus 4. In addition, when the personal computer 5 includes a display panel, the display panel of the personal computer 5 can be used instead of the display apparatus 4.

(Operation Equipment)

Examples of operation equipment configured for a user to operate the appearance inspection apparatus 1 include, but are not limited to, a keyboard 51, a mouse 52, and the like of the personal computer 5, and any equipment configured to be capable of receiving various operations of the user may be used. For example, a pointing device such as a touch panel 41 included in the display apparatus 4 is also included in the operation equipment.

The control unit 2 can detect operations of the user on the keyboard 51 and the mouse 52. In addition, the touch panel 41 is, for example, a conventionally known touch operation panel equipped with a pressure-sensitive sensor, and a touch operation of the user can be detected by the control unit 2. The same applies to a case where another pointing device is used.

(Configuration of Control Unit 2)

The control unit 2 includes a main board 13, a connector board 16, a communication board 17, and a power supply board 18. The main board 13 is provided with a processor 13*a*. The processor 13*a* controls operations of the connected boards and modules. For example, the processor 13*a* outputs an illumination control signal for controlling on/off of the LED 151 to the LED driver 152 of the illumination module 15. The LED driver 152 switches the on/off of the LED 151 and adjusts a lighting time in response to the illumination control signal from the processor 13*a*, and adjusts a light amount and the like of the LED 151.

In addition, the processor 13*a* outputs an imaging control signal for controlling the CMOS sensor 143 to the imaging board 142 of the camera module 14. The CMOS sensor 143 starts capturing and performs the capturing by adjusting an exposure time to an arbitrary time in response to the imaging control signal from the processor 13*a*. That is, the imaging unit 3 captures an image of the inside of a visual field range of the CMOS sensor 143 in response to the imaging control signal output from the processor 13*a*, and captures an image of a workpiece when the workpiece is within the visual field range, but can also capture an image of an object other than the workpiece when the object is within the visual field range. For example, the appearance inspection apparatus 1 can capture a non-defective product image corresponding to a non-defective product and a defective product image corresponding to a defective product by the imaging unit 3 as images for learning of a machine learning network. The image for learning is not necessarily an image captured by the imaging unit 3, and may be an image captured by another camera or the like.

Meanwhile, the imaging unit 3 can capture an image of a workpiece during the operation time of the appearance inspection apparatus. In addition, the CMOS sensor 143 is configured to be capable of outputting a live image, that is, a currently captured image at a short frame rate at any time.

When the capturing by the CMOS sensor 143 is finished, an image signal output from the imaging unit 3 is input to and processed by the processor 13*a* of the main board 13, and stored in a memory 13*b* of the main board 13. Details of a specific processing content by the processor 13*a* of the main board 13 will be described later. Note that a processing apparatus such as an FPGA or a DSP may be provided on the main board 13. The processor 13*a* may be integrated with the processing apparatus such as the FPGA or the DSP.

The connector board 16 is a portion that receives power supply from the outside via a power connector (not illustrated) provided in a power interface 161. The power supply board 18 is a portion that distributes power received by the connector board 16 to the respective boards, modules, and the like, and specifically distributes power to the illumination module 15, the camera module 14, the main board 13, and the communication board 17. The power supply board 18 includes an AF motor driver 181. The AF motor driver 181 supplies drive power to the AF motor 141 of the camera module 14 to implement autofocus. The AF motor driver 181 adjusts power to be supplied to the AF motor 141 in accordance with an AF control signal from the processor 13a of the main board 13.

The communication board 17 is a portion that executes communication between the main board 13, and the display apparatus 4 and the personal computer 5, communication between the main board 13 and external control equipment (not illustrated), and the like. Examples of the external control equipment include a programmable logic controller and the like. The communication may be performed in a wired or wireless manner, and any communication form can be implemented by a conventionally known communication module.

The control unit 2 is provided with a storage apparatus (storage section) 19 configured using, for example, a solid state drive, a hard disk drive, or the like. The storage apparatus 19 stores a program file 80, a setting file, and the like (software) for enabling each control and processing, which will be described later, to be executed by the hardware. The program file 80 and the setting file are stored in a storage medium 90, for example, an optical disk or the like, and the program file 80 and the setting file stored in the storage medium 90 can be installed in the control unit 2. The program file 80 may be downloaded from an external server using a communication line. In addition, the storage apparatus 19 can also store, for example, the above-described image data, parameters for constructing a machine learning network of the appearance inspection apparatus 1, and the like.

That is, the processor 13a of the appearance inspection apparatus 1 is configured to read parameters and the like stored in the storage apparatus 19 to construct a machine learning network, and input a workpiece image obtained by capturing a workpiece as an object to be inspected to the constructed machine learning network to perform quality determination of the workpiece based on the input workpiece image. The use of the appearance inspection apparatus 1 enables execution of an appearance inspection method for performing quality determination of a workpiece based on a workpiece image.

(Learning Process of Machine Learning Network)

Next, a learning process of a machine learning network performed at the time of setting the appearance inspection apparatus 1 will be described with reference to a flowchart illustrated in FIG. 3. The learning process of a machine learning network is to adjust parameters of the machine learning network by inputting a non-defective product image corresponding to a non-defective product and a defective product image corresponding to a defective product to the machine learning network for learning.

In step SA1 after the start, an untrained machine learning network is prepared. In the untrained machine learning network, for example, initial values of parameters are randomly determined. Alternatively, a machine learning network trained to some extent may be prepared in advance for appearance inspection.

In step SA2, a non-defective product image corresponding to a non-defective product is acquired. The non-defective product image acquired here is a non-defective product image for learning illustrated in FIG. 4, and may be a color image or a black-and-white image. For example, the non-defective product image can be acquired by capturing the workpiece as the non-defective product by the camera module 14 of the imaging unit 3. Only one non-defective product image may be acquired, or a plurality of non-defective product images may be acquired by capturing different non-defective products. The acquired non-defective product image is stored in the storage apparatus 19, for example.

In addition, in step SA3, a defective product image corresponding to a defective product is acquired. The defective product image acquired here is a defective product image for learning illustrated in FIG. 4, and may be a color image or a black-and-white image. For example, the defective product image can be acquired by capturing the workpiece as the defective product by the camera module 14 of the imaging unit 3. Only one defective product image may be acquired, or a plurality of defective product images may be acquired by capturing different defective products. The acquired defective product image is stored in the storage apparatus 19, for example. Steps SA1 to SA3 are not necessarily executed in the above-described order.

Figure 4:
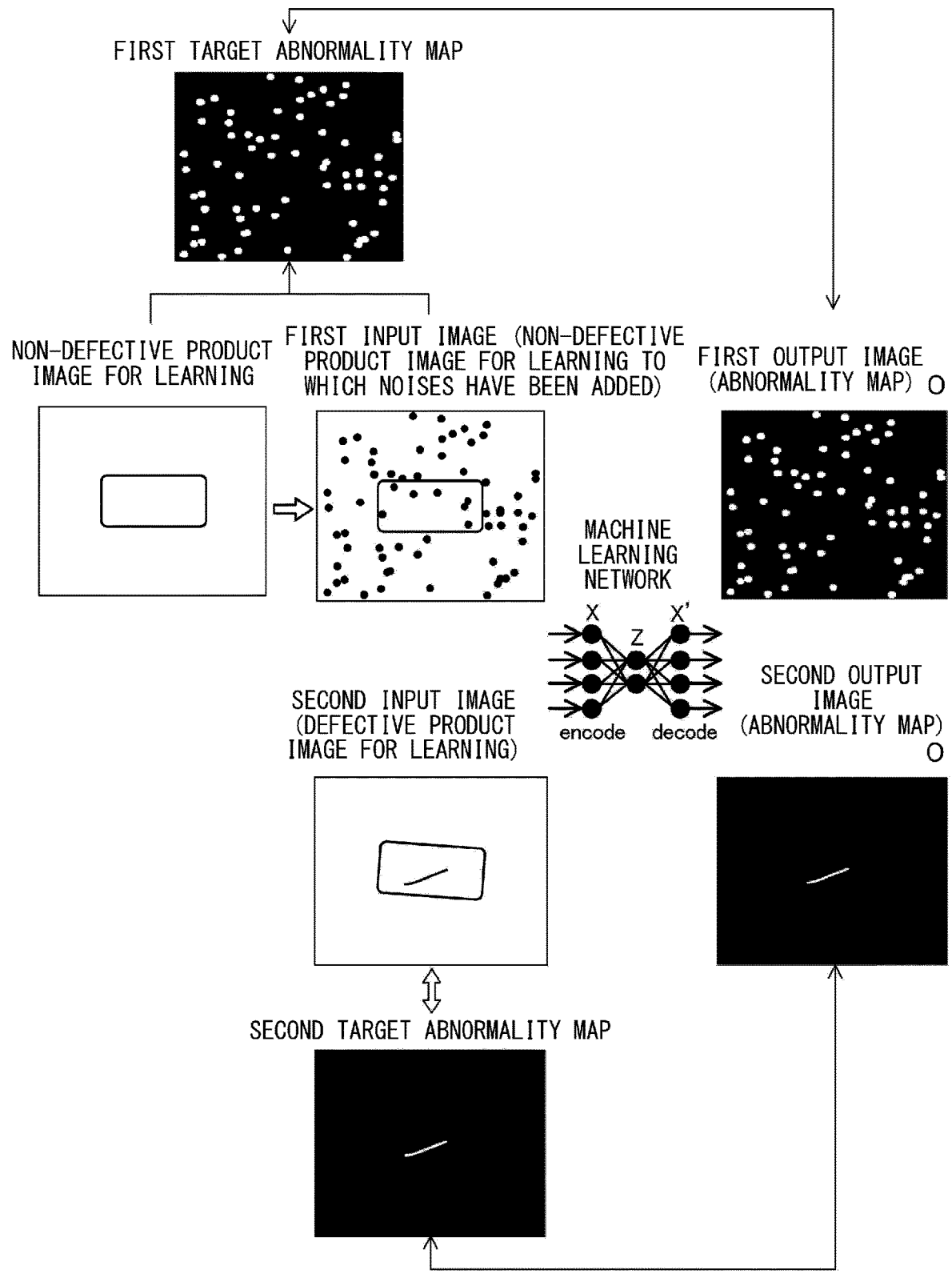
FIG. 4 is a diagram illustrating an input image, an output image, and a target abnormality map image in the learning process of the machine learning network.

In step SA4, a noise is added to the non-defective product image. FIG. 4 illustrates a first input image input to the machine learning network as an image for learning, and this first input image is an image generated by adding a noise to the non-defective product image for learning. Conventionally, as a technique of adding a noise to an image, a technique of adding a single pixel noise according to a Gaussian distribution is commonly used. In this technique, however, a non-defective site, such as the vicinity of an edge of a workpiece, is likely to be erroneously detected as a defective site. In the present embodiment, a technique completely different from the conventional noise adding technique is adopted. That is, the processor 13a randomly adds a plurality of noises having a predetermined size or more to be larger than a single pixel to the non-defective product image for learning, instead of the single pixel. A shape of the noise may be a circle, an ellipse, a polygon such as a rectangle, or may be any shape. In addition, a plurality of types of noises having different shapes may be added to the single non-defective product image for learning. At this time, the processor 13a more increases the amount of the noise to be added to the non-defective product image for learning as the non-defective product image for learning is larger.

In addition, conventionally, a gray noise is generally added when a noise is added to an image, but it is difficult to detect a color abnormality in a case where the gray noise has been added. In the present embodiment, when the non-defective product image for learning is a color image, the processor 13a adds a noise as a noise to the non-defective product image for learning. The color noise is a chromatic color noise, and is noise of a color other than white, black, and gray (ashy color). In a case where a plurality of noises are added to the non-defective product image for learning, a color may be changed for each of the noises, or the same color may be used. In addition, when the non-defective product image for learning is a black-and-white image, a gray noise may be added. A site to which a noise has been added on the non-defective product image for learning is an abnormal site.

After the noise is added, the process proceeds to step SA5. In step SA5, a first target abnormality map image (illustrated in FIG. 4) is generated based on a difference in pixel values between corresponding sites of the non-defective product image for learning (first input image illustrated in FIG. 4) to which the noise has been added in step SA4 and the non-defective product image for learning to which no noise is added. Specifically, an average of absolute values of differences between the added noise (abnormality) and a site corresponding to the noise in the original non-defective product image for learning is calculated, and a predetermined gain is applied to the calculated average value. As a result, it is possible to obtain the first target abnormality map image in which a pixel value of a portion other than the site to which the noise has been added is zero. In this example, a large number of small circular noises are added, and thus, the corresponding to the noise is white and the other portion is black (whose pixel value is zero) in the first target abnormality map image.

In addition, in step SA6, an annotation is executed on the defective product image acquired in step SA3. That is, the user designates that the defective product image acquired in step SA3 is an image corresponding to the defective product. A method for such designation is not particularly limited, and examples thereof include a method of adding a label indicating the defective product image. As a method of adding a label, labels may be added to defective product images one by one, or for example, a plurality of defective product images may be stored in a specific folder, and a label may be collectively given to the defective product images in the folder. The processor 13a can store the defective product image and the label, which is defect information input by the user, in the storage apparatus 19 in association with each other.

In addition, the annotation also includes that the user designates a defective site in the defective product image. For example, the annotation may be an annotation of a region designation scheme in which the user encloses a defective site of a defective product image displayed on the display apparatus 4 to designate the defective site, or may be an annotation of a precise designation scheme in which a defective site is designated in an arbitrary shape by tracing the defective site of a defective product image displayed on the display apparatus 4. The user can select either the region designation scheme or the precise designation scheme.

In the region designation scheme, the user operates the mouse 52 to generate a frame enclosing the defective site of the defective product image. For example, the user can designate the defective site on the defective product image by generating a rectangular, circular, or free-form frame having a size enclosing the defective site.

In the precise designation scheme, when the user moves a filling tool so as to trace a defective site 202a, a portion other than the defective site is less likely to be included in a designated region, and thus, a more precise annotation can be made as compared with the region designation scheme described above. In addition to the filling tool, a defective site may be designated by a magnet tool. The magnet tool can be moved by operating the mouse 52, and moves so as to be automatically attracted to the defective site when being moved to the vicinity of the defective site. When the defective site is moved into a frame connecting a plurality of the magnet tools, it is possible to accurately designate the defective site while reducing burden on the user.

In addition, a defective site may be designated by the GrabCut tool. When a defective site and a periphery of the defective site are enclosed by the GrabCut tool, this region is designated, and an automatic extraction scheme of automatically extracting the defective site in the designated region is executed. In the automatic extraction scheme, only the defective site is designated, and a region in the periphery of the defective site is not designated, and thus, precise designation of the defective site is automatically performed as indicated by a white circle on the right. As a result, the burden on the user can be reduced.

In the case of the GrabCut tool, however, there is a case where precise designation of a defective site fails, and in this case, even a region in a periphery of the defective site is included. In such a case, the user finely designates foreground/background by performing stroke correction or click correction after the execution of the automatic extraction scheme.

In addition, a defective site may be designated by AI-assisted designation. In the case of the AI-assisted designation, an outline of a defective site is roughly designated and extracted, and then, the inside of such an extracted site is designated by a fill tool or the like. As a result, the defective site can be automatically extracted. It is also possible to perform fine correction after the automatic extraction of the defective site.

In step SA7, a second target abnormality map image (illustrated in FIG. 4) is generated based on the defective product image on which the annotation has been executed in step SA6. In this example, the defective site is a linear flaw, and thus, in the second target abnormality map image, the defective site appearing linearly is white, and a portion other than the defective site is black (whose pixel value is zero).

In step SA8, parameters of the machine learning network are adjusted. Specifically, the processor 13a inputs the non-defective product image for learning to which the noise has been added in step SA4, the first target abnormality map image generated in step SA5, the defective product image on which the annotation has been executed in step SA6, and the second target abnormality map image generated in step SA7 to the machine learning network. The non-defective product image for learning and the defective product image constitute a data set. The parameter adjustment of the machine learning network may be performed by the user, may be performed by a manufacturer who manufactures the appearance inspection apparatus 1, or may be performed on a cloud.

As illustrated in FIG. 4, when the non-defective product image for learning to which the noise has been added is input to the machine learning network, a first output image corresponding to the non-defective product image for learning to which the noise has been added is output from the machine learning network. The first output image is an abnormality map indicating a position of the noise. The processor 13a adjusts the parameters of the machine learning network such that the first output image coincides with the first target abnormality map image. That is, the processor 13a executes a first learning process of causing the machine learning network to learn the non-defective product image added with the noise and adjusting the parameters of the machine learning network such that a portion corresponding to the noise is extracted.

In addition, when the defective product image on which the annotation has been executed is input to the machine learning network, a second output image corresponding to the defective product image is output from the machine learning network. The second output image is an abnormality map indicating a position of the defective site designated by the user. The processor 13a adjusts the parameters of the machine learning network such that the second output image coincides with the second target abnormality map image. That is, the processor 13a executes a second learning process of causing the machine learning network to learn the defective product image corresponding to the defective product having the defective site and adjusting the parameters of the machine learning network such that the defective site designated in advance by the user is extracted on the defective product image.

The first learning process can be performed a plurality of times using a plurality of non-defective product images for learning to which a noise has been added and a plurality of first target abnormality map images respectively corresponding thereto. In addition, the second learning process can be performed a plurality of times using a plurality of defective product images on which an annotation has been executed and a plurality of second target abnormality map images respectively corresponding thereto.

When the parameters are adjusted in step SA8, a trained machine learning network is generated. Thereafter, in step SA9, information for constructing the machine learning network, such as the parameters adjusted in step SA8, is stored in the storage apparatus 19 or the like.

(Startup Procedure of Appearance Inspection Apparatus 1)

Figure 5:
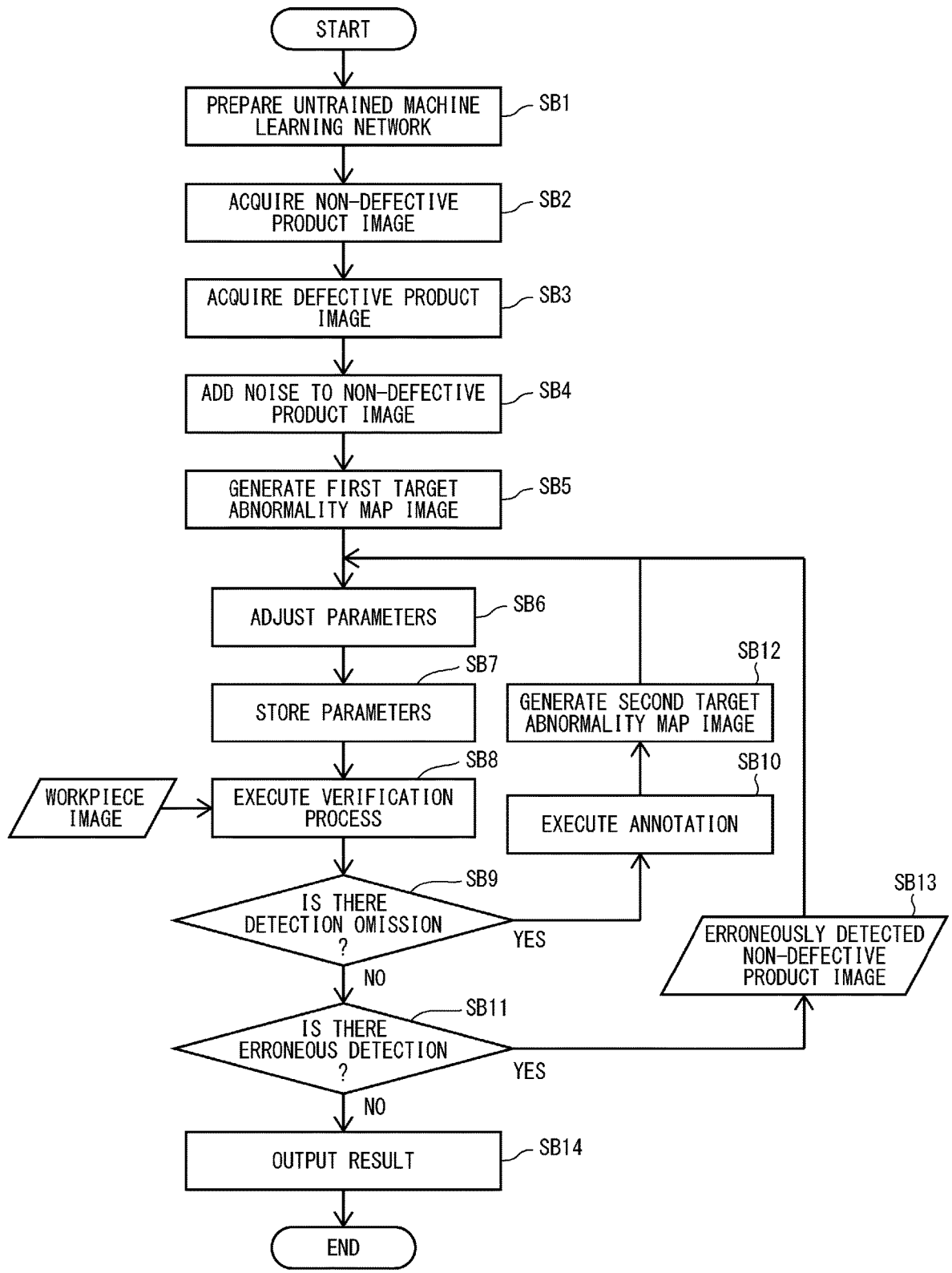
FIG. 5 is a flowchart illustrating an example of a startup procedure of the appearance inspection apparatus.

Although the trained machine learning network can be generated and stored in the storage apparatus 19 at the time of setting the appearance inspection apparatus 1 as described above, a startup process of the appearance inspection apparatus 1 may be executed as in a flowchart illustrated in FIG. 5.

Figure 3:
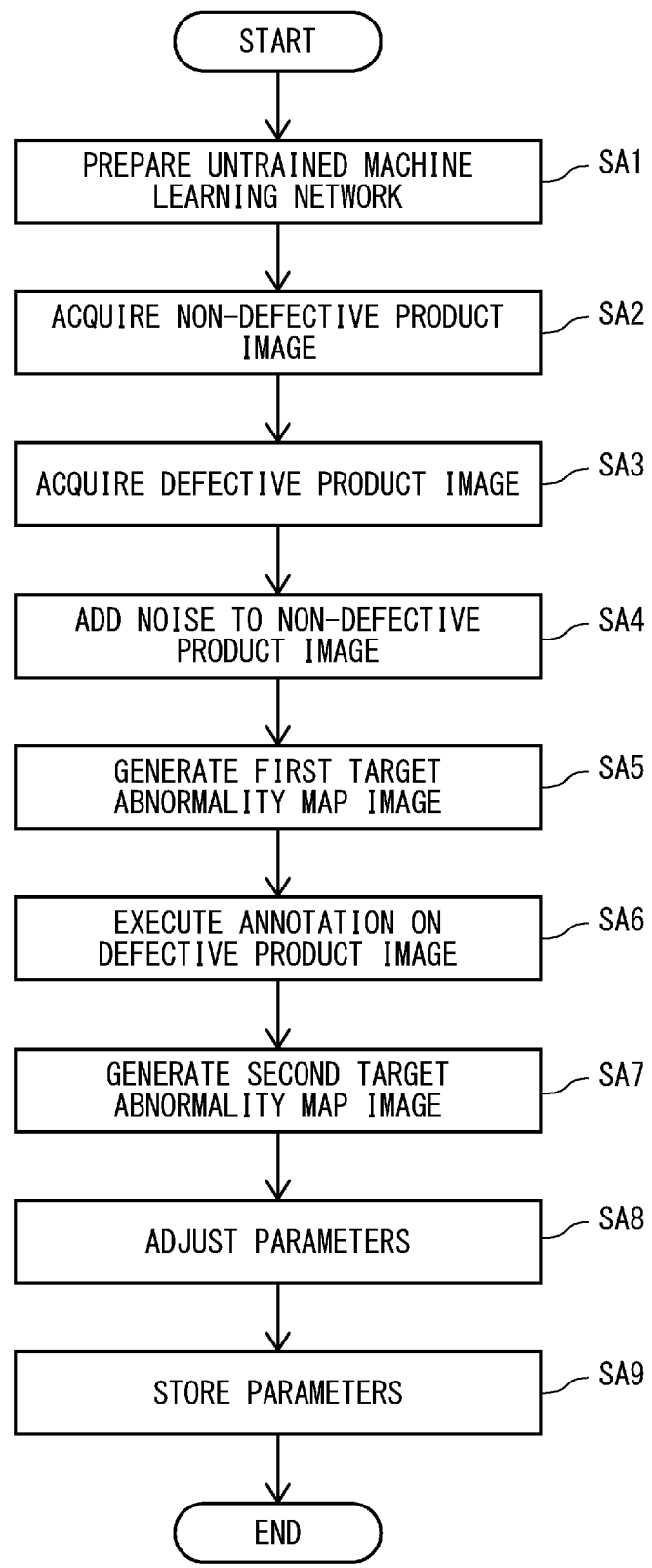
FIG. 3 is a flowchart illustrating an example of a learning process of a machine learning network.

Steps SB1 to SB5 of the flowchart illustrated in FIG. 5 are the same as steps SA1 to SA5 of the flowchart illustrated in FIG. 3. In addition, steps SB6 and SB7 of the flowchart illustrated in FIG. 5 are the same as steps SA8 and SA9 of the flowchart illustrated in FIG. 3. In step SB6, the processor 13a inputs a non-defective product image for learning to which a noise has been added in step SB4 and a first target abnormality map image generated in step SB5 to a machine learning network at the time of adjusting parameters of the machine learning network. Therefore, learning using a defective product image is not performed in the first step SB6.

In step SB8 of the flowchart illustrated in FIG. 5, a verification process is executed. In this verification process, the detection capability of the machine learning network whose parameters have been adjusted in step SA8 of the flowchart illustrated in FIG. 3 is verified. That is, a case is conceivable in which the machine learning network whose parameters have been adjusted in step SA8 has been trained by learning, but the degree of the learning is low. When the operation of the machine learning network in a state in which the degree of learning is low is started, there is a possibility of causing detection omission of a defective product image or erroneous detection in which a non-defective product image is detected as a defect. Therefore, before the operation of a trained machine learning network, the detection capability of the machine learning network is verified such that the detection capability can be increased when the detection capability is insufficient.

Figure 6:
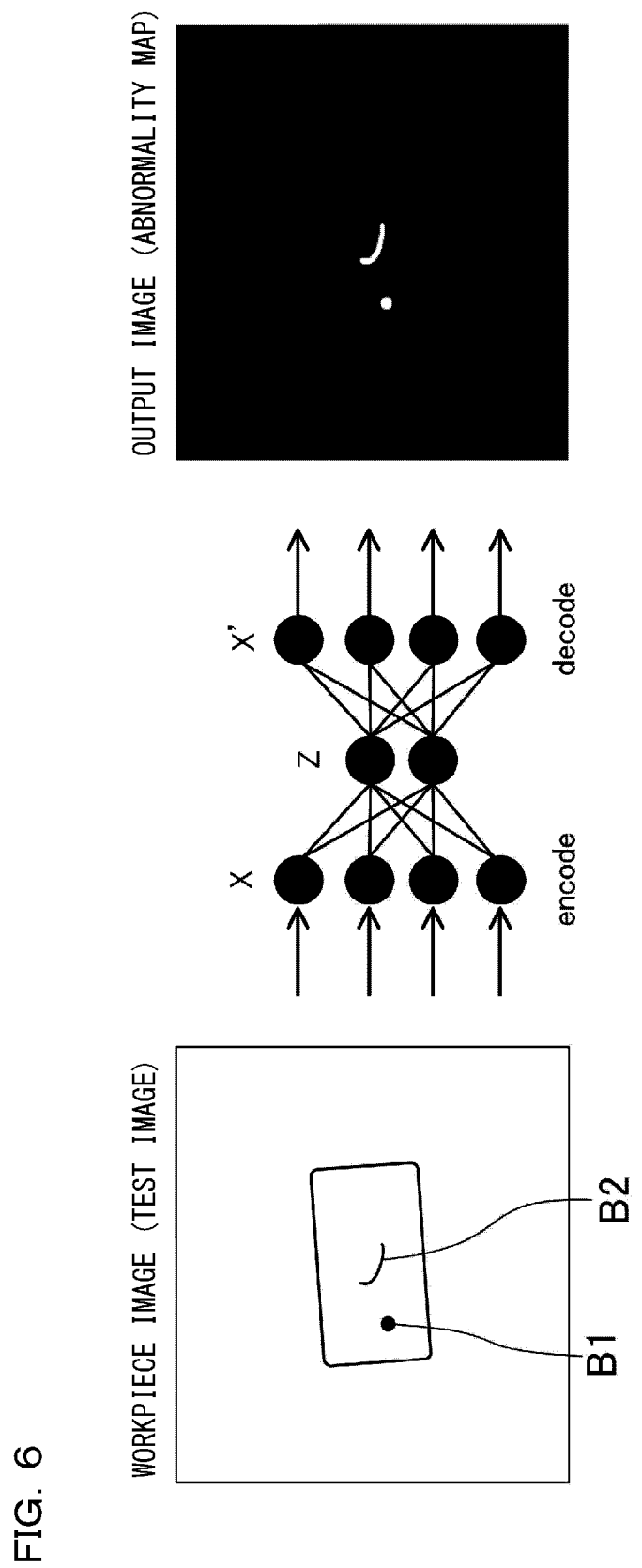
FIG. 6 is a diagram illustrating a case where a workpiece image having a known defect and an unknown defect is input to the machine learning network.

In the verification process, a workpiece image obtained by capturing a defective product is prepared. The workpiece image may be an image acquired before the verification process, an image newly acquired for the verification process, or an image acquired during the operation time of the appearance inspection apparatus 1. The workpiece image is used for verification, and thus, can also be referred to as a test image. As illustrated in FIG. 6, the processor 13a inputs the workpiece image to the trained machine learning network. An output image (abnormality map) corresponding to the workpiece image is output from the machine learning network.

An example illustrated in FIG. 6 illustrates a case where a workpiece has a first defective site B1 and a second defective site B2. That is, a large number of small circular noises are added in the non-defective product image added with the noise illustrated in FIG. 4, but the first defective site B1 in the workpiece image illustrated in FIG. 6 has one circular shape. Thus, the first defective site B1 has a characteristic different from a characteristic of the non-defective product image added with the noise illustrated in FIG. 4, and thus, corresponds to an unknown defect that has not been learned even in the trained machine learning network. However, a non-defective product image added with a noise including a shape of the first defective site B1 is input at the time of learning, and thus, the first defective site B1 can be detected as illustrated as an output image in FIG. 6 even if the first defective site B1 is the unknown defect for the machine learning network.

In addition, the second defective site B2 is almost the same as the defective site designated by the annotation in the second input image illustrated in FIG. 4, and thus, the second defective site B2 corresponds to a known defect having a characteristic designated as a defective site. Since the second defective site B2 is the known defect for the trained machine learning network, the second defective site B2 can be detected by the machine learning network. That is, the processor 13a inputs a workpiece image to the machine learning network whose parameters have been adjusted by the first learning process and the second learning process described above and executes the process of detecting both the unknown defect having the characteristic different from a characteristic of the non-defective product image added with the noise and the known defect having the characteristic designated as the defective site. The verification process may be executed using one workpiece image, or may be executed by sequentially inputting a plurality of mutually different workpiece images to the machine learning network.

The processor 13a is configured to be capable of executing an inspection process of determining that a workpiece of the workpiece image is a defective product when at least one of the unknown defect and the known defect is detected as a result of the detection process, and determining that the workpiece of the workpiece image is a non-defective product when none of the unknown defect and the known defect are detected. Note that it may be determined whether or not at least one of the unknown defect and the known defect is detected at the time of setting without determining the defective product and the non-defective product.

After step SB8, the process proceeds to step SB9. In step SB9, it is determined whether or not there is detection omission as a result of the verification process in step SB8. If there is detection omission in the workpiece image input to the machine learning network, the process proceeds to step SB10. On the other hand, if there is no detection omission in the workpiece image input to the machine learning network, it is determined as NO in step SB9, and the process proceeds to step SB11.

Examples of a case where it is determined as YES in step SB9 can include a case where a workpiece image input to the machine learning network is an image obtained by capturing a defective product but is not determined as a defective product. In this case, in step SB10, the user executes an annotation on the workpiece image corresponding to the defective product input to the machine learning network in step SB8. The annotation can be executed similarly to step SA6 of the flowchart illustrated in FIG. 3. Through step SB10, a defective product image with annotation information can be acquired. The defective product image with annotation information can be added to a data set and stored in the storage apparatus 19 or the like.

In step SB12, a second target abnormality map image is generated based on the defective product image with annotation information as in step SA7 of the flowchart illustrated in FIG. 3. Next, the process proceeds to step SB6, and the processor 13a inputs the defective product image with annotation information and the second target abnormality map image generated in step SB12 to the machine learning network. At this time, the machine learning network is trained with the original data set to which the defective product image with annotation information has been added. Then, an abnormality map indicating a position of a defective site designated by the user is output from the machine learning network. The processor 13a re-adjusts the parameters of the machine learning network such that the abnormality map output from the machine learning network coincides with the second target abnormality map image. That is, the processor 13a executes an update process of training the machine learning network with the defective product image with annotation information in which the defective site has been designated by the annotation and updating the parameters of the machine learning network.

In addition, in step SB11, it is determined whether or not there is erroneous detection. If there is erroneous detection in the workpiece image input to the machine learning network, the process proceeds to step SB13. On the other hand, if there is no erroneous detection in the workpiece image input to the machine learning network, it is determined as NO in step SB11, and the process proceeds to step SB14. In step SB14, a result of the verification process is output and presented to the user.

Examples of a case where it is determined as YES in step SB11 can include a case where a workpiece image input to the machine learning network is an image obtained by capturing a non-defective product but is determined as a defective product. In this case, in step SB13, an image (erroneously detected non-defective product image) determined as a defective product despite being a non-defective product image is acquired, and the process proceeds to step SB6. In step SB6 after passing through step SB13, the processor 13a inputs the non-defective product image acquired in step SB13 to the machine learning network for learning. At this time, the machine learning network is trained with the original data set to which the non-defective product image has been added. As a result, the update process of updating the parameters of the machine learning network can be executed.

(Specific Method of Learning of Machine Learning Network)

Next, an example of a specific method of learning of a machine learning network will be described. For example, learning of a machine learning network can be performed by minimizing a loss function. Although there are various definitions of the loss, the Mean Square Error (MSE) can be exemplified.

$$\text{Loss} = \frac{1}{n} \sum_{x,y} (T_{x,y} - O_{x,y})^2 \quad \text{[Formula 1]}$$

Here, T is a target abnormality map, 0 is an output image (abnormality map), n is the number of pixels in which the image T is 0, and x and y are pixel positions. Note that a loss function such as the Binary Cross Entropy can also be used. The above is merely an example, and a learning method of a machine learning network is not limited to these methods.

(Operation Time of Appearance Inspection Apparatus 1)

Figure 7:
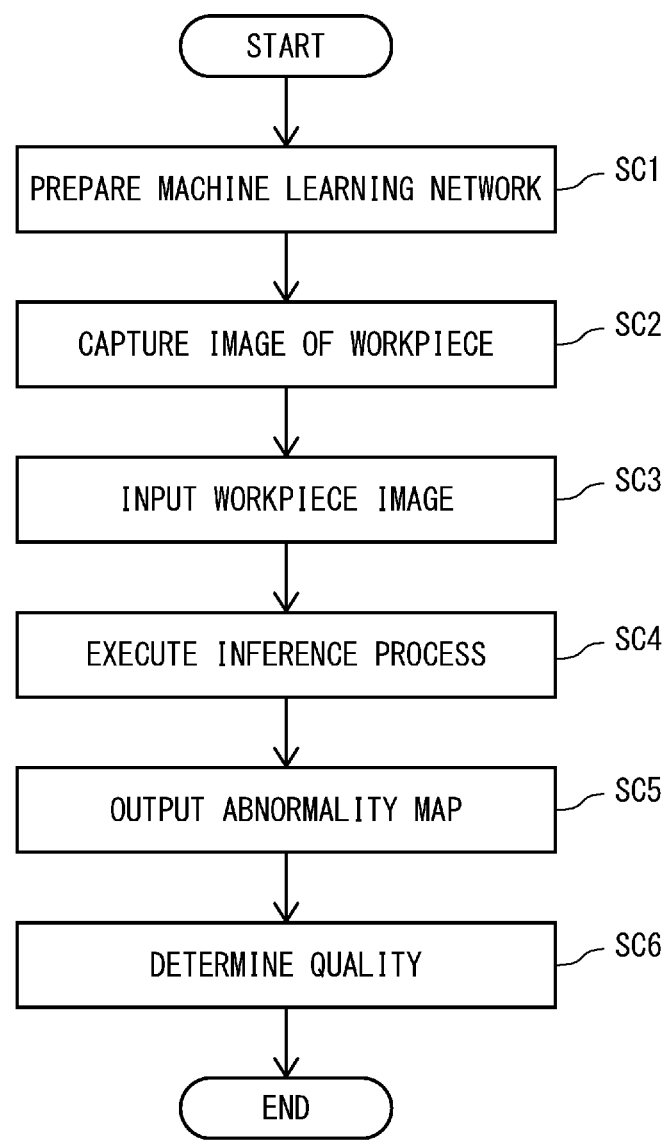
FIG. 7 is a flowchart illustrating an example of a procedure during the operation time of the appearance inspection apparatus.

Next, the operation time of the appearance inspection apparatus 1 will be described based on a flowchart illustrated in FIG. 7. In step SC1 after the start, the processor 13a reads parameters and the like stored in the storage apparatus 19 to prepare a trained machine learning network. In step SC2, the imaging unit 3 captures an image of a workpiece as an object to be inspected to acquire a workpiece image. Thereafter, the process proceeds to step SC3, and the workpiece image acquired in step SC2 is input to the machine learning network prepared in step SC1.

Next, in step SC4, the machine learning network executes an inference process of the workpiece image input in step SC3. Thereafter, in step SC5, the machine learning network outputs an abnormality map as a result of the inference process. The abnormality map indicates the presence or absence of an unknown defect having a characteristic different from a non-defective product image added with a noise, and the presence or absence of a known defect having a characteristic designated as a defective site.

Thereafter, in step SC6, the quality of the workpiece is determined based on the abnormality map output in step SC5. That is, it is determined that the workpiece is a defective product when at least one of the unknown defect having the characteristic different from a characteristic of the non-defective product image added with the noise and the known defect having the characteristic designated as the defective site is detected, and it is determined that the workpiece is a non-defective product when none of the unknown defect and the known defect are detected. This quality determination is performed by the processor 13a. A result of the quality determination of the workpiece can be output to, for example, the display apparatus 4 or the like to be presented to the user, and can be stored in the storage apparatus 19. Note that steps SC2 to SC6 can be executed each time a workpiece changes.

Functions and Effects of Embodiment

As described above, the learning of the machine learning network is not performed only with the defective product image on which the annotation has been executed, but the learning of the machine learning network can be performed also using the non-defective product image added with the noise. Therefore, it is possible to generate the machine learning network having not only high detection capability for a known defect included in the defective product image used for learning but also high detection capability for an unknown defect, and thus, a learning difficulty level is reduced as compared with a case where the inference process is performed in both the non-defective product learning model and the defective product learning model as in the related art, so that the labor at the time of learning can be reduced, and a process of combining inference results is unnecessary at the time of appearance inspection, and thus, a takt time during the operation time is shortened.

The above-described embodiment is merely an example in all respects, and should not be construed as limiting. Further, all modifications and changes belonging to the equivalent range of the claims fall within the scope of the invention.

As described above, the invention can be used in the case of inspecting an appearance of a workpiece.

What is claimed is:

1. An appearance inspection apparatus comprising:
a storage section that stores a machine learning network; and
a processor that inputs a workpiece image obtained by capturing a workpiece, which is an object to be inspected, to the machine learning network and determines quality of the workpiece based on the input workpiece image, wherein the processor is configured to be capable of executing:

a first learning process of adding a noise to a non-defective product image corresponding to a non-defective product to cause the machine learning network to learn the non-defective product image added with the noise, and adjusting a parameter of the machine learning network such that a portion corresponding to the noise is extracted;

a second learning process of causing the machine learning network to learn a defective product image corresponding to a defective product having a defective site, and adjusting the parameter of the machine learning network such that the defective site designated in advance by a user on the defective product image is extracted; and a process of detecting both an unknown defect having a characteristic different from a characteristic of the non-defective product image and a known defect having a characteristic designated as the defective site, by inputting the workpiece image to the machine learning network of which the parameter has been adjusted through the first learning process and the second learning process.

2. The appearance inspection apparatus according to claim 1, wherein the processor executes, when performing a setting, the first learning process of causing an input image, obtained by adding a noise to the non-defective product image, to be input to the machine learning network and adjusting the parameter of the machine learning network such that an abnormality map indicating a position of the noise becomes a first output image, and the second learning process of causing the defective product image, for which the designation of the defective site by the user has been received, to be input to the machine learning network and adjusting the parameter of the machine learning network such that an abnormality map indicating a position of the defective site designated by the user becomes a second output image.

3. The appearance inspection apparatus according to claim 2, wherein during the first learning process, the processor generates a target abnormality map image, based on a difference in pixel values between corresponding sites of the non-defective product image added with the noise and a non-defective product image to which the noise is not added, and adjusts the parameter of the machine learning network such that the first output image coincides with the target abnormality map image.

4. The appearance inspection apparatus according to claim 1, wherein the processor randomly adds a plurality of the noises having a predetermined size or more to the non-defective product image.

5. The appearance inspection apparatus according to claim 1, wherein the processor adds the noise as a color to the non-defective product image when the non-defective product image is a color image.

6. The appearance inspection apparatus according to claim 1, wherein the processor more increases an amount of the noise to be added to the non-defective product image as the non-defective product image is larger.

7. The appearance inspection apparatus according to claim 1, wherein the processor adds a plurality of types of the noise having different shapes to the single non-defective product image.

8. The appearance inspection apparatus according to claim 1, wherein the processor executes an update process of causing the machine learning network to learn an original data set to which a defective product image with annotation information in which a defective site is designated by an annotation has been added and updating the parameter of the machine learning network, in a case where the workpiece image is an image obtained by capturing a defective product, but is not determined as the defective product.

9. The appearance inspection apparatus according to claim 1, wherein in a case where the workpiece image is an image obtained by capturing a non-defective product but is determined as a defective product as a result of the inspection process, the processor executes an update process of causing the machine learning network to learn an original data set to which the image has been added as a non-defective product image and updating the parameter of the machine learning network.

10. An appearance inspection method of inputting a workpiece image obtained by capturing a workpiece, which is an object to be inspected, to a machine learning network and determining quality of the workpiece based on the input workpiece image, the appearance inspection method comprising:

a first learning process of adding a noise to a non-defective product image corresponding to a non-defective product to cause the machine learning network to learn the non-defective product image added with the noise, and adjusting a parameter of the machine learning network such that a portion corresponding to the noise is extracted;

a second learning process of causing the machine learning network to learn a defective product image corresponding to a defective product having a defective site and adjusting the parameter of the machine learning network such that the defective site designated in advance by a user on the defective product image is extracted; and a process of detecting both an unknown defect having a characteristic different from a characteristic of the non-defective product image and a known defect having a characteristic designated as the defective site, by inputting the workpiece image to the machine learning network of which the parameter has been adjusted through the first learning process and the second learning process.

* * * * *